United States Patent [19]

Jan

[11] Patent Number: 4,475,772
[45] Date of Patent: Oct. 9, 1984

[54] PROCESS FOR RECOVERING URANIUM AND OTHER BASE METALS

[75] Inventor: Raymond J. Jan, Lakewood, Colo.

[73] Assignee: Wyoming Mineral Corporation, Lakewood, Colo.

[21] Appl. No.: 275,536

[22] Filed: Jun. 18, 1981

Related U.S. Application Data

[63] Continuation of Ser. No. 881,955, Feb. 27, 1978, abandoned.

[51] Int. Cl.³ .................................. E21C 41/14
[52] U.S. Cl. ............................... 299/5; 423/7; 423/17
[58] Field of Search ............... 299/4, 5; 423/7, 17

[56] References Cited

U.S. PATENT DOCUMENTS

| | | | |
|---|---|---|---|
| 2,838,370 | 6/1958 | Calkins | 423/7 |
| 2,896,930 | 7/1959 | Menke | 423/17 X |
| 2,992,887 | 7/1961 | Thunaes et al. | 23/14.5 |
| 3,130,960 | 4/1964 | Martin | 299/5 |
| 3,156,644 | 11/1964 | Kunin | 210/32 |
| 3,792,903 | 2/1974 | Rhoades | 299/5 |
| 3,853,981 | 12/1974 | Hadzeriga | 423/24 |
| 4,066,297 | 1/1978 | Spence | 299/4 |
| 4,105,253 | 8/1978 | Showalter | 299/4 |

FOREIGN PATENT DOCUMENTS

910025 11/1962 United Kingdom .................... 423/7

OTHER PUBLICATIONS

"Desal Process" Rohm and Haas Publication 1971, pp. 1–30.

Primary Examiner—Ernest R. Purser
Attorney, Agent, or Firm—A. Mich, Jr.

[57] ABSTRACT

Uranium and other base metals are leached from their ores with aqueous solutions containing bicarbonate ions that have been generated or reconstituted by converting other non-bicarbonate anions into bicarbonate ions. The conversion is most conveniently effected by contacting solutions containing $SO_4^=$ and $Cl^-$ ions with a basic anion exchange resin so that the $SO_4^=$ and $Cl^-$ ions are converted into or exchanged for $HCO_3^-$ ions. $CO_2$ may be dissolved in the solution so it is present during the exchange. The resin is preferably in bicarbonate form prior to contact and $CO_2$ partial pressure is adjusted so that the resin is not fouled by depositing metal precipitates. In-situ uranium mining is conducted by circulating such solutions through the ore deposit. Oxidizing agents are included in the injected lixiviant. The leaching strength of the circulating bicarbonate lixiviant is maintained by converting the anions generated during leaching or above-ground recovery processes into $HCO_3^-$ ions. The resin may conveniently be eluted and reformed intermittently.

25 Claims, 3 Drawing Figures

4,475,772

PROCESS FOR RECOVERING URANIUM AND OTHER BASE METALS

This is a continuation of application Ser. No. 881,955, filed Feb. 27, 1978 now abandoned.

BACKGROUND OF THE INVENTION

One convenient method of recovering metal values from underground ore deposits incorporates the in-situ leaching of the deposit. A lixiviant or leach solution that will dissolve the metal is pumped or injected into the underground deposit. The enriched or pregnant leach solution containing the dissolved metal value is raised up above ground where the metal value is recovered. After the recovery, the now barren solution is typically reinjected into the deposit. The ability to essentially continuously recirculate or recycle the leach solution is at least eminently desirable if not necessary in such in-situ solution mining schemes. To maintain the efficacy of the spent leach solution, fortification with the solubilizing compounds will be necessary at least periodically.

Several problems attend the in-situ solution mining techniques and militate against the success of the technique. The leaching solutions often react with minerals other than the desired metal values so that the solutions become contaminated with undesired materials. The dissolved contaminants may be difficult to separate from the dissolved desirable metal values. Substantial amounts of expensive leaching compounds may be lost beyond recovery in the underground deposit. Long continuous recirculation of leach solutions may adversely affect the aquifer because ions may be captured by the mineral deposits. These ions may be retained in or near the mining zone long after the mining operation is terminated and be released to the aquifer to adversely affect water quality. Extensive restoration activities may be mandated to prohibit or minimize this adverse effect. Water available at the site is a valuable resource for purposes other than mining and should not be contaminated so as to destroy its other utilities.

Underground water saturated ore bodies containing oxide, sulfide or carbonate minerals of base metals such as uranium, copper, nickel, molybdenum, rhenium, selenium and vanadium are exemplary candidates for in situ solution mining. Uranium is an example of particularly valuable base metal. The known solution mining techniques for the recovery of uranium and the other base metals may include both acid and alkaline leach solutions. When the ore deposit contains substantial amounts of calcite, the alkaline carbonate-bicarbonate lixiviant has particular advantages. Ammonium or sodium carbonate-bicarbonate lixiviants are both known to be advantageous because they are less corrosive than acid lixiviants, are more selective in dissolving and then separating the uranium from other metals. Uranium is now believed to be present in the deposit in its reduced, e.g. insoluble tetravalent form and may have to be oxidized to its soluble hexavalent form either before or during leaching.

Deposits that are suitable for in situ solution mining typically include a permeable stratuum disposed between impermeable strata. The leaching solutions can then be restricted to the permeable base metal rich stratuum. That permeable stratuum should be afterwards restored as nearly as possible to its original state. Where the permeable stratuum is capable of yielding considerable quantities of water to wells or springs, great attention and effort are directed to disturbing the original water quality as little as possible and/or restoring it to its original quality if it is adversely affected by the injected recirculating compositions. Initial or baseline measurements on the aquifer or formation waters provide data on the original water composition, e.g. baseline TDS data (total dissolved solids). After the base metal is extracted but before the in situ mining operation is considered completed, the formation water ordinarily must be restored to some acceptable level near the baseline quality.

In the previously known processes, making the initial and/or reconstituting the recirculating lixiviant have been particularly troublesome because of their perturbative environmental effects, particularly on the formation waters. Restoration to or near the original or base line levels has, in some instances, been difficult, time consuming and, therefore, expensive.

PRIOR ART

U.S. Pat. No. 3,792,903 discloses a solution mining process in which a buffer zone is formed within the mineral deposit area with soft water; cations can be removed by ion exchange.

U.S. Pat. No. 3,853,981 is directed to recovery of coppe and zinc by a process which removes zinc contaminating ions from copper recovery steps.

U.S. Pat. No. 3,156,644 discloses a deionization process which permits both cations and anions to be removed from water.

A Rohm and Haas publication entitled "DESAL PROCESS" discloses desalination processes. (30 pp., 1971.)

U.S. Pat. No. 2,992,887 uses low pressure $CO_2$ to maintain the integrity of $Na_2CO_3$ in a lixiviant for uranium.

U.S. Pat. No. 3,130,960 uses a solution of $CO_2$ to leach uranium.

U.S. Pat. No. 4,066,297 discloses a process of solution mining uranium with an alkaline leach solution and the removal of metal ions from the recirculating solution.

SUMMARY OF THE INVENTION

It is an object of this invention to provide a process for generating and maintaining or reconstituting a lixiviant or leaching solution in a manner that makes it particularly suitable for in-situ solution mining because it is free of or minimizes environmental perturbations.

The lixiviant is generated and/or reconstituted by converting potentially pertubative inactive ion species that are present in available water or spent aqueous based lixiviants into active leaching ion species. Perturbative anions such as $Cl^-$ and $SO_4^=$ are converted into the active metal leaching $HCO_3^-$ ions to either initially create or reconstitute spent lixiviants. Using anion exchange resins to effect the conversion to $HCO_3^-$ ions avoids the introduction of perturbating cations and permits the lixiviant to be formed and the recirculating lixiviant to maintain its $HCO_3^-$ concentration with no, little or minimal adverse effects on the environment.

DESCRIPTION OF THE INVENTION

Figure 1:
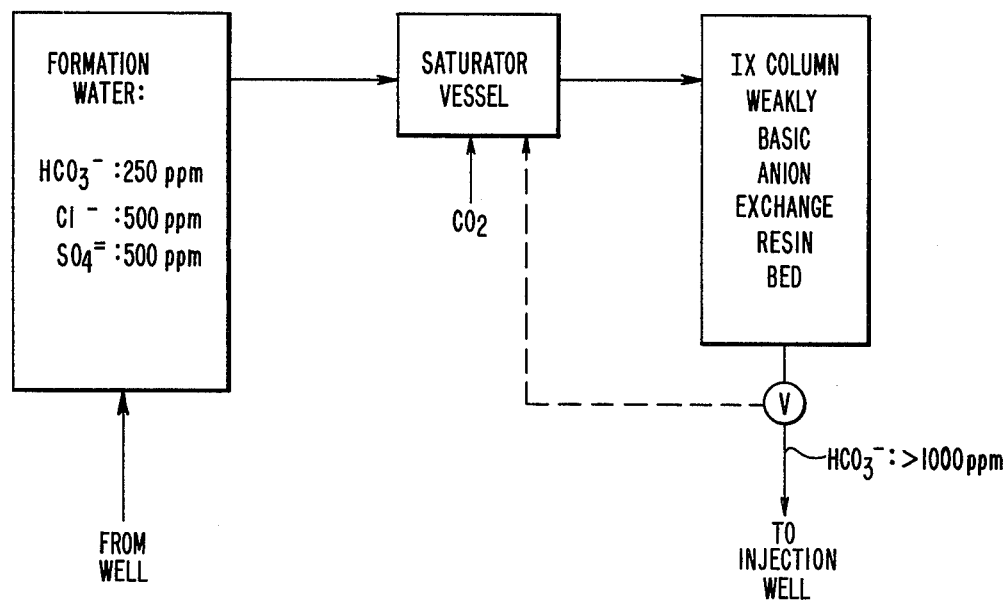
FIG. 1 is a schematic flow diagram illustrating an example of preparing a leach solution where the base composition of the formation water has a relatively high anionic strength.

One aspect of my invention begins with the conversion into a leaching solution of a saline brackish formation water which could be found, for example, in the bore holes at the site of a new solution mining well field. In accordance with sound environmental practices, one desires to use the available water in a manner that will not adversely affect the mining zone or permit relatively convenient restoration to or near its original condition. This is especially true of formation water. The dissolved solids in the formation water, which can, of course, be characterized a solution, will primarily be chloride, sulfate, carbonate and/or bicarbonate salts of sodium, calcium, magnesium and potassium. For the purposes of my invention, a suitable relatively high total dissolved solids (TDS) is a sufficient amount of dissolved solids to provide water having a cationic strength of about 1000 ppm expressed in $HCO_3^-$ equivalents. Either of the following baseline compositions of formation waters available at two different Texas mining sites can be conveniently converted by my invention into bicarbonate leaching solutions that will leach soluble uranium values from underground deposits without contaminating the aquifer:

|  | Water L | | Water B | |
|---|---|---|---|---|
| Ions | PPM | PPM $HCO_3^-$ Eq. | PPM | PPM $HCO_3^-$ Eq. |
| $Ca^{++}$ | 170 | | 250 | |
| $Mg^{++}$ | 20 | | 60 | |
| $Na^+$ | 460 | | 350 | |
| $K^+$ | 26 | | 20 | |
| $HCO_3^-$ | 250 | 250 | 150 | 150 |
| $SO_4^=$ | 580 | 722 | 60 | 75 |
| $Cl^-$ | 500 | 859 | 800 | 1375 |
| Total $HCO_3^-$ Eq: | | 1831 ppm | Total $HCO_3^-$ Eq: | 1600 ppm |

Water L had a pH of 7.5 and Water B had a pH of 7.6. It should be noted that while the actual analyses also reported the cations, it is the natural anion concentration of the water that determines the potential strength of the leach solution to be generated.

After the initial baseline analysis of the formation water, the cationic strength in $HCO_3^-$ equivalents is calculated by adding together the actual concentration of the $HCO_3^-$ ions and the actual concentration of the other anions expressed as $HCO_3^-$ equivalents, the latter calculated by the formula:

$$HCO_3^- Eq. = \frac{\text{Molecular Wt. Anion}}{\text{Molecular Wt. } HCO_3^-} \times \text{Valence of Anion.}$$

It should be understood that the 580 ppm of $SO_4^=$ can be converted to 720 ppm of $HCO_3^-$ by exchanging the $SO_4^=$ anions in the water for $HCO_3^-$ ions available from the basic form or preferably the bicarbonate form of an anion exchange resin.

As will become more apparent hereinafter, one of the most significant advantages of my invention is not only the generation of the $HCO_3^-$ ion from other anions but also that the generation avoids the addition of cations. One way of accomplishing the conversion involves the use of a strongly basic anion exchange resin. The exchange between the resin in bicarbonate form and the $Cl^-$ anion, may be represented or illustrated by the equation:

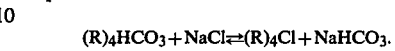
$(R)_4HCO_3 + NaCl \rightleftharpoons (R)_4Cl + NaHCO_3.$

Regenerating the exhausted bed of the strongly basic anion exchange resin requires a considerable amount of $NaHCO_3$. Because they are more readily regenerated, I prefer to use weakly basic anion exchange resins. The exchange for these resins, in basic form, and the $Cl^-$ anion, may be represented by the following formulae. The generation of the weakly basic anion exchange resin is illustrated by the equation:

$R-N + CO_2 + H_2O \rightleftharpoons (R-NH)HCO_3.$

With the resin in the bicarbonate form the general representation would be:

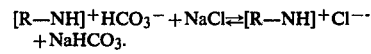
$[R-NH]^+ HCO_3^- + NaCl \rightleftharpoons [R-NH]^+ Cl^- + NaHCO_3.$

For reasons which will appear later in this description, I prefer to use the bicarbonate resin form and to use a resin prepared with tertiary amines. The preference for the tertiary amines is because that is the weakest basic resin form and it requires no significant excess of material in the resin regeneration step. My preference for the $HCO_3^-$ form of the resin, rather than the basic form, is related to the ability to more easily avoid metal precipitation on the resin because of localized high basicity. This will be more fully described later in connection with the description of regenerating recirculating lixiviants.

The desired exchange of anions on the preferred tertiary amine weakly basic anion exchange resin may be represented by the equation:

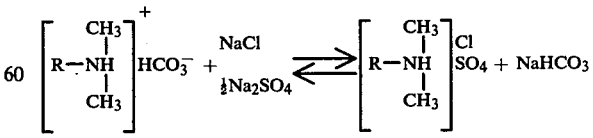

wherein R is aryl, aralkyl or an alkyl group in the $C_8$ to $C_{11}$ range or a mixture of alkyl groups in which the average number of carbons falls in the range of 8 to 11. Such weakly basic anion exchange resins are known in the art and are described, for example, in U.S. Pat. No.

3,156,644. They are particularly desirable in this invention because of the ease with which the bicarbonate form of the resin can be generated and regenerated. The regeneration can be accomplished with a lime slurry or any alkaline reagent, e.g. $Na_2CO_3$, NaOH or $NH_3$, with stoichiometric quantities or only a slight excess. The $CO_2$ required for the reaction can be readily generated at the mining site with fuel oil fired conventonal $CO_2$ generators or water scrubbed stack gases. The following reactions take place:

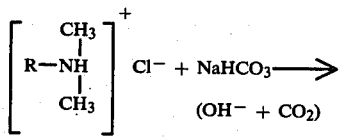

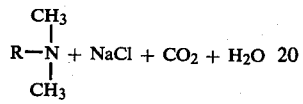

and then

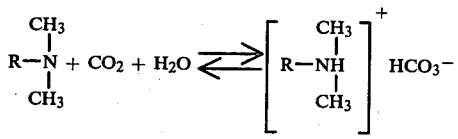

Suitable weakly basic anion exchange resins are commercially available. Examples of suitable commercial resins are Amberlite IRA-68 and Amberlite IRA-94 (Rohm and Haas); Dowex 44 and Dowex MWA-1 (Dow Chemical Co.); Duolite A-7 (Diamond Shamrock); and Ionac A-260 (Ionac Corp.).

The bicarbonate form of anion exchange resins, especially the weakly basic form, is particularly advantageous because it is highly selective for most all common anions such as $SO_4^=$, $Cl^-$, etc. This means that formation water ions other than bicarbonate ions will be easily and conveniently converted into bicarbonate ions in the formation water and thus generate an effective bicarbonate leach solution. Such leach solutions can be employed to leach base metals such as uranium from underground deposits without adversely affecting the mining zone. Using a resin in the bicarbonate form, it should be emphasized, permits the other anions to be converted to bicarbonate ions without the addition of other cations, e.g. $Na^+$ or $NH_4^+$. Other methods of forming bicarbonate leaching solutions would require the addition of compounds such as ammonium carbonate, sodium carbonate, potassium carbonate and/or their respective bicarbonates. It should be apparent that while the addition of these compounds to the water would indeed increase the bicarbonate concentration and form a solution that would leach uranium, the concentration of cations such as $Na^+$, $NH_4^+$, etc. would be increased in the aquifer when the leaching solution was recirculated through the deposit. Potential exchanges or reactions between minerals or compounds in the mining zone and these added cations would cause these cations to be retained in the aquifer and may require subsequent removal in restoration processes if the limits above baseline are exceeded. With my invention, the base line cation concentrations are not affected and the natural equilibrium is retained.

Where the water at the mining site has a low salinity or is below about 500 ppm in $HCO_3^-$ equivalents, the desired $HCO_3^-$ concentration cannot be attained with only the above-described conversion. In such cases, i.e. where the formation or available water has a relatively low TDS, carbon dioxide may be injected into the water while it is being circulated through the ore deposit so that the TDS and the $HCO_3^-$ concentration is increased. If a satisfactory anionic strength is not reached in a reasonable time, then a minimal amount of compounds may be added to raise the anionic strength to a level where the desired concentration of $HCO_3^-$ can be obtained. The measured baseline data can be helpful in deciding what compounds should be added to the water.

The following is a base line analysis of a relatively low TDS formation water having a pH of 8.7 available at a mining site:

| Ions | Water I PPM | PPM $HCO_3^-$ Eq. |
|---|---|---|
| Ca | 8 | |
| Mg | 1 | |
| Na | 130 | |
| K | 2 | |
| $HCO_3^-$ | 90 | 90 |
| $SO_4^=$ | 200 | 249 |
| $Cl^-$ | 12 | 21 |
| | Total $HCO_3^-$Eq: | 360 ppm |

It is, of course, apparent from the $HCO_3^-$ Eq. (equivalents) of 360 ppm, that the water cannot be converted to a bicarbonate solution with the desired $HCO_3^-$ concentration of at least about 500 ppm. Carbon dioxide is injected into the formation water and the water is circulated through the ore body until a suitable solution pH is reached. Bicarbonate, carbonate, chloride and/or sulfate salt of sodium are/is added until the $Na^+$ reaches about 380 ppm, when the $HCO_3^-$ equivalence will equal about 1023 ppm. Now the $Cl^-$ and $SO_4^=$ ions can be converted to $HCO_3^-$ ions as they were above.

It should be noted that with the above low TDS water, the choice was not to add ions which were at a low level in the baseline measurements, but rather ions which were already at a higher concentration were added. If, for example, 120 ppm of cation is to be added, it is preferable to increase the $Na^+$ to 250 ppm than to increase either the $K^+$ or $Mg^{++}$ an equivalent amount. The reason is that it is simpler to restore from 250 ppm to 130 ppm than it would be to restore from 122 ppm to 2 ppm.

Referring now to FIG. 1, formation water is withdrawn from a well and passed into a saturator vessel where $CO_2$ is injected into the water. The water containing dissolved $CO_2$ is then passed to the IX column (resin exchange) containing a bed of weakly basic anion exchange resin in solid particulate form. The $HCO_3^-$ concentration of the water emanating from the IX column is checked to assure the conversion of sufficient $SO_4^=$ and $Cl^-$ to provide a desirable amount of $HCO_3^-$. The solution may be recirculated as indicated by the broken line in the event that one pass through the IX column is not sufficient to generate the desired $HCO_3^-$ concentration.

Figure 2:
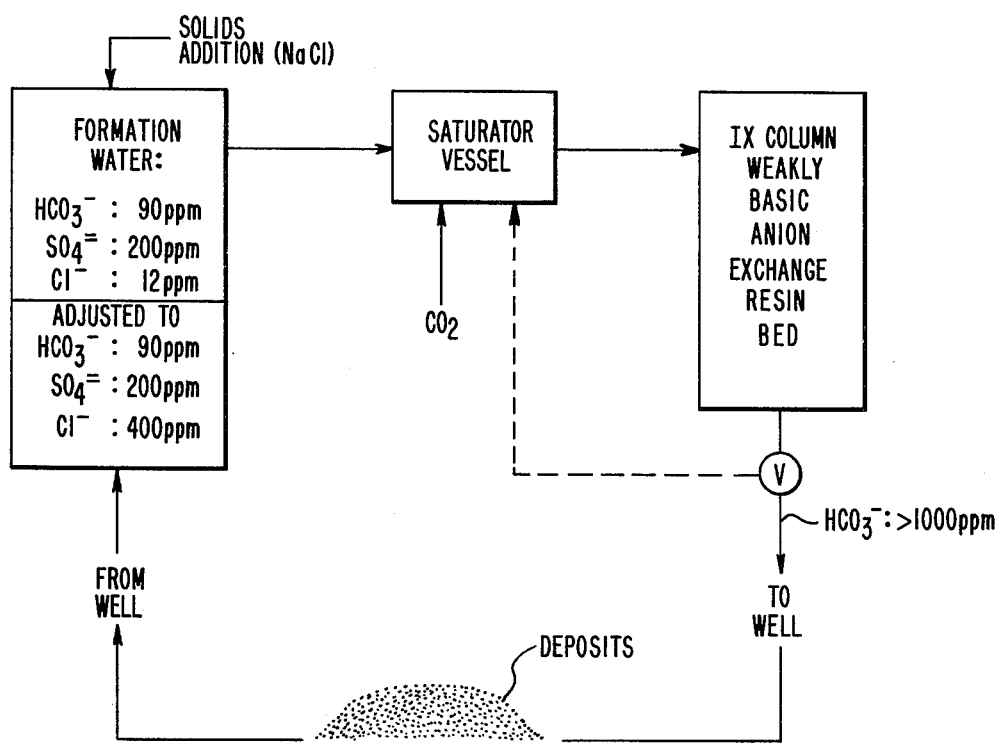
FIG. 2 is a schematic flow diagram illustrating an example of preparing a leach solution where the base composition of the formation water has a relatively low anionic strength.

FIG. 2 is a simple schematic diagram illustrating a process similar to that presented in FIG. 1 except that the water is circulated through the deposit and solids are added to generate the desired $HCO_3^-$ concentration from a formation water having a relatively low TDS. The earlier description of Water I is a detailed example of this process.

The foregoing descriptions have been limited to the initial preparation of a leaching solution or lixiviant to focus on the mechanisms of conversion or exchange of anions such as $SO_4^=$ and $Cl^-$ to or for $HCO_3^-$. It should be understood that the most significant benefits will attend the described conversion or exchange in a continuous or long running in situ uranium mining operation where a bicarbonate lixiviant is recirculated in a pattern of injection wells extending into the porous ore deposit and extracted from a pattern of productions wells extending up from the ore deposit. As the lixiviant is recirculated, primary aboveground production operations include the recovery of uranium dissolved in the pregnant lixiviant and lixiviant fortification.

The pregnant lixiviant is contacted with a strong base anion exchange resin to remove uranium which is loaded on the resin as a complex carbonate anion. Two fixed bed IX columns may be employed and they may be alternately cycled between loading and elution. Dowex 21K (Dow Chemical Co.) is a suitable commercially available resin. It is typically in $Cl^-$ form and after loading may be eluted with a chloride solution. The uranium may be recovered from the pregnant eluate in any of various known methods to provide, for example, an ammonium or sodium diuranate. It should be noted that the chloride exchange and leakage from the resin constitutes a source of chloride ion build-up in the recirculating lixiviant.

The barren lixiviant must be reconstituted or fortified before it can be reinjected into the ore deposit. While any $HCO_3^-$ present is effective at least about 500 ppm would be generally used. From about 1000 to about 2000 ppm is considered the ideal bicarbonate concentration range. Some increase in uranium dissolution may be noted up to about 5000 ppm but there is a leveling off and greater concentrations are uneconomical with most underground deposits.

It should be understood that the leaching solution has been described in terms of $HCO_3^-$ or bicarbonate ion concentration. This is a term of art that should be understood to actually include other ions in an equilibrium relation consistent with general carbonate-bicarbonate and dissolved carbon dioxide equilibrium aqueous solutions. The term of art is used for convenience but it will be understood to actually include all of the foregoing species, i.e. $HCO_3^-$, $CO_3^=$ and dissolved $CO_2$.

Where, for example, ammonium ions, sodium ions or other cations are added to lixiviant to restore the desired $HCO_3^-$ concentration in the spent barren lixiviant, ecological perturbations which are difficult to reverse may occur. A significant degree of ion exchange is believed to occur between the lixiviant and the host minerals of the ore deposit. Cation exchange predominates although some degree of anion exchange also occurs. A significant tendency to exchange $Ca^{++}$ in the host mineral for monovalent cations (such as ammonium, sodium and potassium) in the lixiviant have a significant impact on the lixiviant reconstitution requirements and restoration phases. The net loss of leach chemicals across the ore deposit (generally about 500 ppm of $HCO_3^-$) necessitates continuing reconstitution of lixiviant. A significant portion of any cations added in the continuing reconstitution are accumulated in the host minerals. There is, of course, a strong public interest that requires the existing ecological balances to be minimally disturbed. Restoration to or near to the baseline quality is desirable and, indeed, mandated by governmental agencies particularly where water or aquifer quality is a prime concern. The profound advantages of continuously reconstituting the spent lixiviant without adding cations should now be apparent. Oxidation of $NH_4^+$ ions can be a source of contaminating $NO_3^-$ ions.

Before the $HCO_3^-$ reconstituted lixiviant is injected back into the ore deposit, an oxidant such as hydrogen peroxide, oxygen, air, etc. is added so that uranium which is in the insoluble reduced form will be oxidized to the soluble form and dissolve in the bicarbonate solution. It should be noted that the oxidant also oxidizes portions of sulfides in the deposit and causes $SO_4^=$ ions to build up in the recirculating lixiviant. Chlorides may also be built up and it should be apparent that these anions are eliminated in a useful manner in my process, i.e. they are exchanged for $HCO_3^-$ ions in the reconstitution step.

The anion exchange for the reconstitution may be conducted before or after the uranium removal by ion exchange but is preferably conducted afterwards, i.e. on the barren solution. As was noted earlier hereinabove, a weakly basic anion exchange resin is preferred over strongly basic anion exchange resins. The weakly basic anion exchange resin may be in its basic form in the IX column. $CO_2$ may be added or injected into the solution prior to or in the IX column. Anions such as $SO_4^=$, $Cl^-$ and $NO_3^-$ will be converted into $HCO_3^-$ before emerging from the IX column. Alternatively, the resin in the IX column can be first converted into the $HCO_3^-$ form. Again, anions such as $SO_4^=$, $Cl^-$ and $NO_3^-$ will be converted into $HCO_3^-$ before the lixiviant emerges from the IX column. $NO_3^-$ anions can be introduced in oxidant stabilizers, for example.

Initial experimental results with barren lixiviants that retain small amounts of metal cations such as uranium, vanadium, etc., indicates that the localized high pH present in the resin bed causes some metal precipitation which coats or contaminates the resin beds. This fouling is eliminated when $CO_2$ is injected into the lixiviant prior to entry into the IX column and the resin is already in the bicarbonate form. The IX column itself must be partially pressurized or at least blanketed with $CO_2$. A saturator vessel may be included prior to the IX column. The $CO_2$ in this vessel is at a pressure of at least several psi. The solution will have a pH in the range of 5 to 7 as it emerges from the saturator. Two fixed bed IX columns may also be utilized here so that loading and elution can be alternated thus providing continuous flow.

The subsequent steps of calcium removal and $CO_2$ injection may sometimes be advantageously included to provide pH control to either minimize possible calcium precipitation and consequent flow blocking or simply to make the injected lixiviant conform to the baseline pH. Ordinarily, it is desirable to maintain the pH of the injected solution in the range of about 6 to 9.

Figure 3:
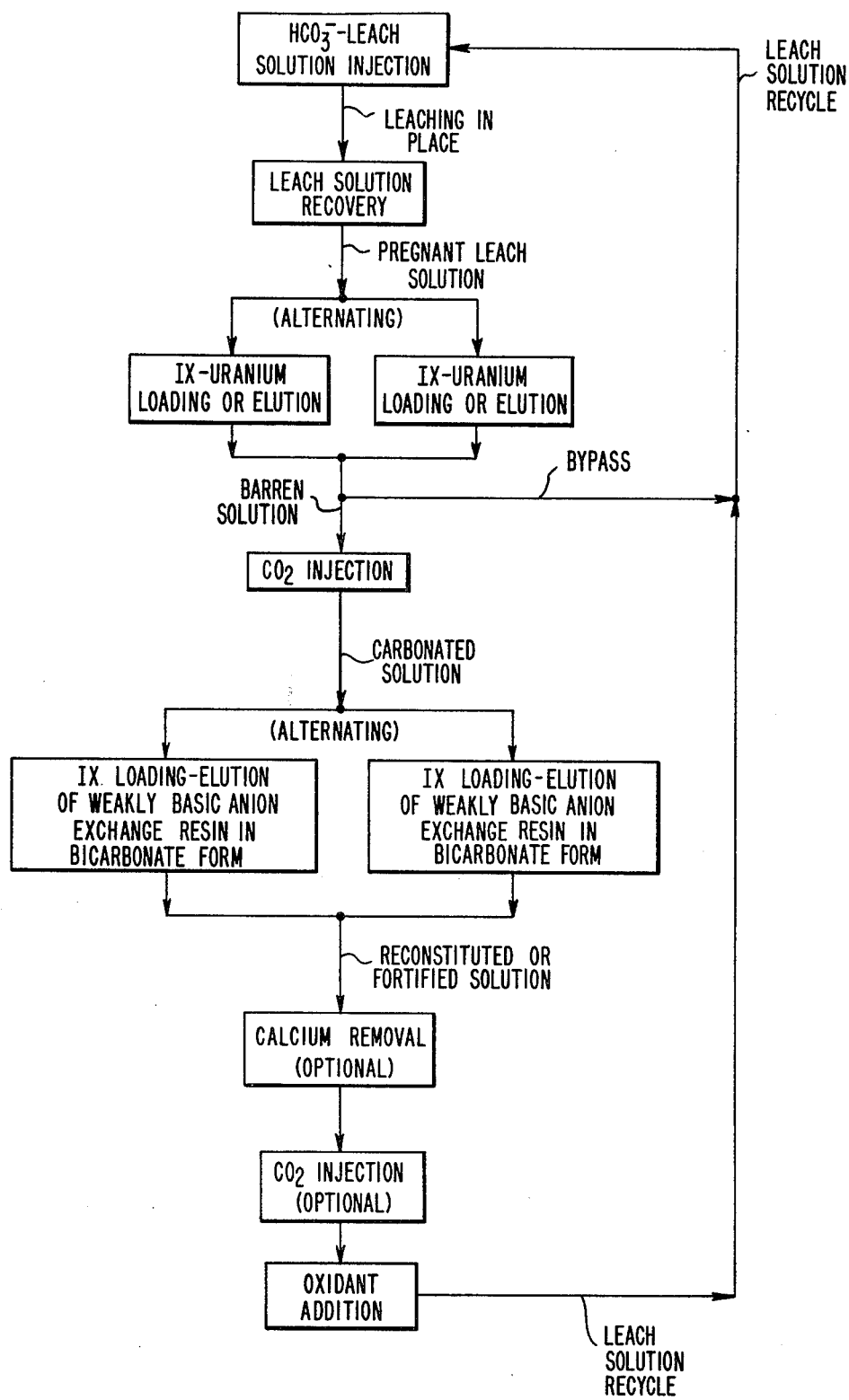
FIG. 3 is a more detailed schematic flow diagram illustrating a process of an in-situ solution mining with a continuous flow or recirculation of lixiviant wherein the bicarbonate strength of the continuously circulating lixiviant is maintained at a level to dissolve desired metal values.

Referring now to FIG. 3, we have illustrated the steps of injecting the bicarbonate leach solution, the in situ or leaching in place of uranium at the underground deposit and recovering the pregnant leach solution. Now in above-ground operations, the uranium is recovered by loading and eluting on a strongly basic anion exchange resin. Shown as alternating cycles in two IX columns, it should be understood that other IX techniques, e.g. resin bed transfer could be employed. As described in detail heretofore, the barren solution is saturated with $CO_2$ and then anions such as $SO_4^=$, $Cl^-$ are $NO_3^-$ and exchanged for $HCO_3^-$ ions in the IX columns. The columns may be alternately loaded and eluted. The reconstituted or fortified lixiviant now has an $HCO_3^-$ concentration between about 1000 ppm and 2000 ppm. The optimal steps of calcium removal and $CO_2$ injection provide a convenient means for controlling the pH of the recycled lixiviant. After the addition of the oxidant, the solution is injected back into the ore deposit. Although not illustrated, it should be understood that a sufficiently high concentration of $HCO_3^-$ ions may, in some instances, be generated by passing only a portion of the barren solution from the uranium IX column to the $CO_2$ tank and diverting the remainder to the recycle leach.

The foregoing description may be characterized, for example, as a minimum perturbation process. The principles of the invention, however, may also be used in what may be more appropriately characterized as a restorative in-situ mining process. Where, for example, an initial process has employed ammonia or compounds containing cations to continuously reconstitute the lixiviant, these cations may already be retained in the mineral deposit because of the underground exchange and retention of monovalent cations described hereinabove. The subsequent use of this process would provide non-equilibrium conditions at the ore deposit, causing those cations to revert to the circulating lixiviant as the uranium is being mined. The undesired or contaminating cations can be continuously removed from the recovered lixiviant above ground and the aquifer will be slowly restored to or nearer its baseline quality.

It should be understood that profound environmental advantages attend this invention because of the conversion of otherwise contaminating anions into useful bicarbonate ions. As the in-situ mining operation continues, there is no accumulation of the anions (and their associated cations) in the recirculating lixiviant. At mining sites having relatively high TDS (and high anionic strength) formation water, the $Cl^-$ and $SO_4^=$ (and associated cations such as sodium), for example, will essentially stay near their baseline levels. Thus, restoration after mining is considerably simplified, if not completely eliminated insofar as anions such as $Cl^-$ and $SO_4^=$ are concerned. With this process, the carbonate-bicarbonate levels are raised above baseline levels but not to any levels greater than processes which add bicarbonate salts of sodium or ammonium for maintaining leaching strength. Moreover, it is not difficult to restore the carbonate-bicarbonate levels back to or near baseline levels after the mining is ceased by precipitation, for example, with lime. Because TDS levels remain relatively constant and because the levels of $SO_4^=$, $Cl^-$ and other such anions are not increased, the consequences of leach solution migrations and excursions are not serious. At mining sites having relatively low TDS (and low anionic strength), only the cation levels (e.g. $Na^+$) are increased because of solid salt additions. The $Cl^-$ and $SO_4^=$ levels are not increased. Again, the carbonate-bicarbonate levels are not increased more than with other processes. The increase in sodium, moreover, is limited to that caused by the initial singular salt addition, a relatively small increase compared to continuous additions.

Base metals other than uranium can be susceptible to solution in bicarbonate lixiviants, particularly those where the mineral deposit contains the metal in oxide or sulfide form. Uranium, as well as other metals, can be in-situ solution mined with acid lixiviants, e.g. $H_2SO_4$. By using appropriate cation exchangers above ground one may design a continuous leaching process with a minimal effect on the environment. Indeed, the use of certain ion exchangers could be advantageous ecologically in above-ground leaching processes where lixiviants can be used repeatedly or continuously so that reconstitution is possible.

I claim:
1. A process for extracting soluble base metal values from an underground ore deposit comprising the steps of:
   (1) withdrawing from a formation an aqueous solution which includes anions other than bicarbonate anions,
   (2) converting the said other anions to bicarbonate ions, to provide a bicarbonate leach solution,
   (3) injecting the leach solution into said ore deposit to dissolve the soluble metal values,
   (4) withdrawing the pregnant leach solution, and
   (5) recovering metal values from the pregnant leach solution.
2. The process of claim 1 wherein the metal value is uranium.
3. The process of claim 2 wherein the first anions are converted to bicarbonate anions in contacting an anion exchange resin with the aqueous solution.
4. The process of claim 1 wherein carbon dioxide is present in the aqueous solution when the first ions are converted.
5. The process of claim 3 wherein the exchange resin is a weakly basic anion exchange resin in bicarbonate form.
6. The process of claim 5 wherein the weakly basic anion exchange resin is a resin characterized by the formula

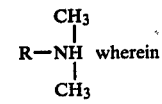

R is selected from the group consisting of aryl, aralkyl and an alkyl group in the $C_8$ to $C_{11}$ range and mixtures of alkyl groups in which the average number of carbons falls in the range of 8 to 11.

7. The process of claim 2 wherein carbon dioxide is dissolved in the aqueous solution when the first ions are converted.
8. The process of claim 5 wherein carbon dioxide is dissolved in the aqueous solution when the solution is contacted with the weakly basic ion exchange resin.
9. The process of claim 8 wherein said contact occurs at a pressure greater than atmospheric.
10. The process of claim 1 wherein an oxidant is added to the leach solution before it is injected into the ore deposit.
11. The process of claim 10 wherein the oxidant is selected from the group of oxidants consisting of air, oxygen, sodium perchlorate and hydrogen peroxide.
12. The process of claim 1 wherein the uranium dissolved in the pregnant leach solution is in the form of an anionic carbonate and is recovered by fixation on a strong or intermediate basic anion exchange resin.

13. The process of claim 12 wherein the anion exchange resin is in a form selected from the group consisting of chloride, sulfate, carbonate or nitrate forms.

14. The process of claim 1 wherein the leach solution injected into said ore deposit contains at least about 500 ppm of $HCO_3^-$.

15. The process of claim 1 wherein the leach solution $HCO_3^-$ concentration is between about 1000 ppm and about 2000 ppm.

16. A process for recovering uranium from an underground ore deposit comprising the steps of injecting a bicarbonate leach solution into an underground mining zone to dissolve uranium values in said zone and provide a pregnant leach solution and thereby decreasing the concentration of bicarbonate anions and increasing the concentration of other anions such as sulfate, chloride and nitrate anions in the leach solution, withdrawing said pregnant leach solution, contacting the withdrawn solution with an anion exchange resin so that the dissolved uranium is loaded on said resin, contacting the withdrawn solution with an anion exchange resin in bicarbonate form so that aforesaid other anions are exchanged for the resin bicarbonate anions.

17. The process of claim 16 wherein said contact with resin in bicarbonate form is at a $CO_2$ partial pressure.

18. The process of claim 17 wherein said withdrawn solution is at a pH between about 5 and 7 when it contacts the bicarbonate form resin.

19. A process for recovering a metal value from an underground mining zone comprising the steps of contacting the metal value in situ with a leaching solution containing an ionic species effecting the solubilization of said metal, the solubilization reducing the concentration of the effective ionic species and increasing the concentration of other ionic species such as sulfate, chloride and nitrate ions in the solution, withdrawing the pregnant leach solution, recovering the metal value from the pregnant solution and contacting the leach solution with an ion exchange resin in the form of said effective ion species so that the reducing concentration of the effective ion species is increased as the other ionic species are adsorbed by the resin.

20. In the method of mining uranium in an underground zone wherein a bicarbonate leach solution is injected into the zone and withdrawn from said zone with an increased concentration of other anions such as sulfate, chloride and nitrate anions, the improvement comprising contacting the withdrawn solution with an anion exchange resin in bicarbonate form so that said other anions are exchanged.

21. The method of claim 20 wherein the anion exchange resin is a weakly basic anion exchange resin.

22. The method of claim 21 wherein carbon dioxide is in the solution during resin contact.

23. In the method of mining uranium in an underground zone wherein a leach solution containing sulfate, chloride or nitrate anions is withdrawn from said zone, the improvement comprising contacting said leach solution with an ion exchange resin in bicarbonate form to effect an adsorption of the sulfate, chloride or nitrate ions on said resin prior to injecting said solution into said zone.

24. The method of claim 23 wherein said anion exchange resin is a weakly basic anion exchange resin.

25. The method of claim 24 wherein carbon dioxide is in said solution during resin contact.

* * * * *